United States Patent [19]

Matsuura

[11] Patent Number: 4,750,008

[45] Date of Patent: Jun. 7, 1988

[54] THERMAL TRANSFER PRINTER

[75] Inventor: Takanobu Matsuura, Takizawa, Japan

[73] Assignee: Alps Electric Co., Ltd., Japan

[21] Appl. No.: 1,034

[22] Filed: Jan. 7, 1987

[30] Foreign Application Priority Data

Feb. 26, 1986 [JP] Japan .............................. 61-27054[U]

[51] Int. Cl.[4] .......................... G01D 15/10; B41J 3/20

[52] U.S. Cl. ................................ 346/76 PH; 400/120; 400/198; 400/208; 400/247

[58] Field of Search .................... 346/76 PH; 400/120, 400/198, 208, 247

[56] References Cited

U.S. PATENT DOCUMENTS

| | | | |
|---|---|---|---|
| 3,855,448 | 12/1974 | Hanagata et al. | 219/216 |
| 4,325,645 | 4/1982 | Miyajima et al. | 400/196.1 |
| 4,563,692 | 1/1986 | Negita et al. | 346/76 PH |
| 4,653,939 | 3/1987 | Hibino | 400/120 |

*Primary Examiner*—E. A. Goldberg
*Assistant Examiner*—Gerald E. Preston
*Attorney, Agent, or Firm*—Guy W. Shoup

[57] ABSTRACT

A thermal transfer printer wherein a ribbon cassette adapted to receive therein an ink ribbon which is guided outside from a ribbon take-out portion in a manner such that the ribbon is drawn out of a ribbon pull-in portion is placed on a carriage, and a head mounting member supporting the thermal head is disposed within a recess formed on the platen side of the carriage so that the mounting member may be moved to and from the platen, characterized by the provision of a moving mechanism in which the width of the recess in the carriage moving direction is formed to be larger than that of the head mounting member in the same direction as the former so that the carriage and the head mounting member may be relatively moved in the carriage moving direction, and the head mounting member and the carriage may be relatively moved so that when the head mounting member is projected from the recess of the carriage toward the platen, the head mounting member is moved close to the ribbon pull-in portion of the ribbon cassette within the recess.

5 Claims, 5 Drawing Sheets

THERMAL TRANSFER PRINTER

BACKGROUND OF THE INVENTION

1. Field of the Invention

The present invention relates to a thermal transfer printer which is used as an output device such as typewriters, word processors, computers, etc., and more particularly to an improvement in a peel angle of an ink ribbon.

2. Description of the Prior Art

Generally, a theremal transfer printer has a columnar support shaft 3 extending lengthwise of a platen 1, the shaft 3 being located frontwardly and downwardly of the platen 1 having a platen rubber 2 lined on the front surface thereof, as shown in FIG. 5. A carriage 4 which is movable lengthwise of the platen 1 is disposed along the support shaft 3. A ribbon cassette 5 encasing therein an ink ribbon 6 is placed on the carriage 4, and a thermal head 8 supported on a head mounting member 7 is disposed movably lengthwise of the platen 1 integral with the carriage 4. The head mounting member 7 is swingingly supported on the support shaft 3, and a rearwardly projecting guide plate 9 is provided on the mounting member 7. A ]-shaped portion 12 at the end of a rotating shaft 11 supported swingingly on a pin 10 is relatively movably fitted in the rear end of the guide plate 9. One end of a spring 13 is mounted on the rotating shaft 11 so that the head mounting member 7 is always urged by means of the spring 13 in the direction where the thermal head 8 is pressed against the platen 1 through the rotating shaft 11 and the guide plate 9. A solenoid 14 is connected to the rotating shaft 11 so that when the solenoid 14 is driven, the head mounting member 7 is rotated clockwise in FIG. 5 against the force of the spring 13 to relase the thermal head 8 from the connection with the platen 1.

FIG. 6 shows a specifica example of the ribbon cassette 5. The ink ribbon 6 encased in the ribbon cassette 5 has its middle portion guided outside from a ribbon take-out portion 5A formed in the front surface of the ribbon cassette 5, and the ink ribbon 6 pisitioned thereat is pulled into the ribbon cassette 5 from a ribbon pull-in portion 5B. The ink ribbon 6 is moved by rotation of a rotating drum 15 in a direction as indicated by the arrow. The ribbon cassette 5 at the back of the ink ribbon 6 is further formed with a recess 16, to which the thermal head 8 faces.

In the conventional thermal transfer printer, as shown in FIGS. 7 and 8, the carriage 4 moved along the support shaft 3 by means of a wire 17 is formed with a recess 18 in which the head mounting member 7 is fitted. The head mounting member 7 is moved within the recess 18 in a direction to and from the platen 1 by the action of the spring 13 and solenoid 14 shown in FIG. 5.

With the above-described construction, when the solenoid 14 stops to be driven, the head mounting member 7 is swung counterclockwise in FIG. 5 by the action of the spring 13, and the mounting member 7 of FIG. 7 to the state where the former is positioned within the recess 18 to the state where the head mounting member 7 of FIG. 8 is projected toward the platen 1, and at that time, the thermal head 8 clamps the ink ribbon 6 and a record paper 19 (FIG. 5) between it and the platen 1, whereby ink at a predetermined position of the ink ribbon 6 is transferred onto the paper 9 by heat of the thermal head 8.

However, in the aforementioned conventional thermal transfer printer, as shown in FIG. 9, in the state where the thermal head 8 is pressed against the platen 1 through the ink ribbon 6 and paper 19, an angle $\theta$ formed between the end of the thermal head 8 and the ribbon pull-in portion 5B of the ribbon cassette 5, that is, the peel angle $\theta$ of the ink ribbon 6 is given by $$\theta = \tan^{-1}(a/b)$$

where a represents the distance from the front surface of the thermal head 8 to the projection 20 of the ribbon cassette 5, and b represents the distance from the end of the thermal head 8 to the pull-in portion 5B of the ribbon cassette 5. This angle $\theta$ becomes a relatively samll angle because of the presence of wall thickness c of teh ribbon cassette 5.

If the peel angle $\theta$ is small as described above, when the ink ribbon 6 is heated by the thermal head 8 to transfer ink of the ink ribbon 6 onto the paper 19, ink becomes transferred also onto the paper 19 in the outer peripheray of a portion to be printed, and as a result, the print becomes collapsed and hard to see.

SUMMARY OF THE INVENTION

The present invention overcomes these problems noted above and provides a thermal transfer printer which can peel an ink ribbon from a record paper with a large peel angle to provide a clear print.

According to the present invention, there is provided athermal transfer printer wherein a ribbon cassette adapted to receive therein an ink ribbon which is guided outside from a ribbon take-out portion in a manner such that the ribbon is drawn out of a ribbon pull-in portion is placed on a carriage, and a head mounting member supporting the thermal head is disposed within a recess formed on the platen side of the carriage so that the mounting member may be moved to and from the platen, characterized by the provision of a moving mechanism in which the width of the recess in the carriage moving direction is formed to be larger than that of the head mounting member in the same direction as the former so that the carriage and the head mounting member may be relatively moved in the carriage moving direction, and the head mounting member and the carriage may be relatively moved so that when the head mounting member is projected from the recess of the carriage toward the platen, the head mounting member is moved close to the ribbon pull-in portion of the ribbon cassette within the recess.

According to the present invention, when the head mounting member is projected from the recess of the carriage toward the platen, the head mounting member assumes a position close to the projection of the ribbon cassette by means of the moving mechanism. Therefore, the ink ribbon can be peeled from the record paper with a large peel angle, and the ink may be transferred onto a predetermined record paper to effect a clear print.

DESCRIPTION OF THE PREFERRED EMBODIMENTS

Embodiments of the present invention will be described in detail with reference to the drawings, in which the following parts similar to or corresponding to those shown above with respect to prior art are indicated numerals used in prior art, and description thereof will be omitted.

Figure 1:
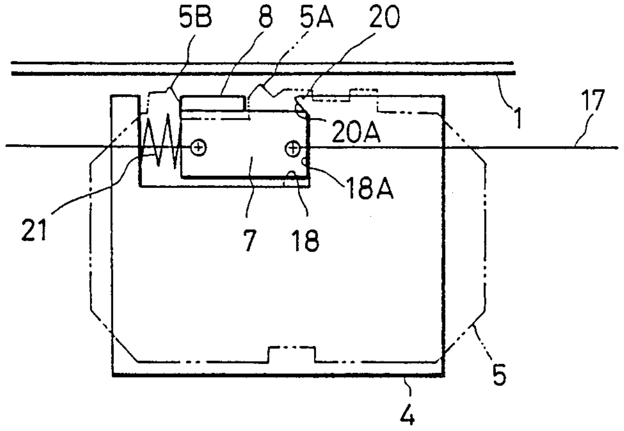
FIGS. 1 and 2 are schematic plan views, respectivity, showing an embodiment of a thermal transfer printer according to the present invention with a thermal head located at different positions.
Figure 2:
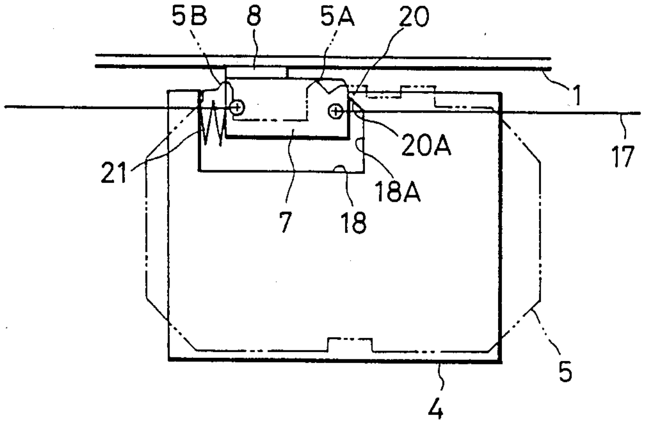
Figure 5:
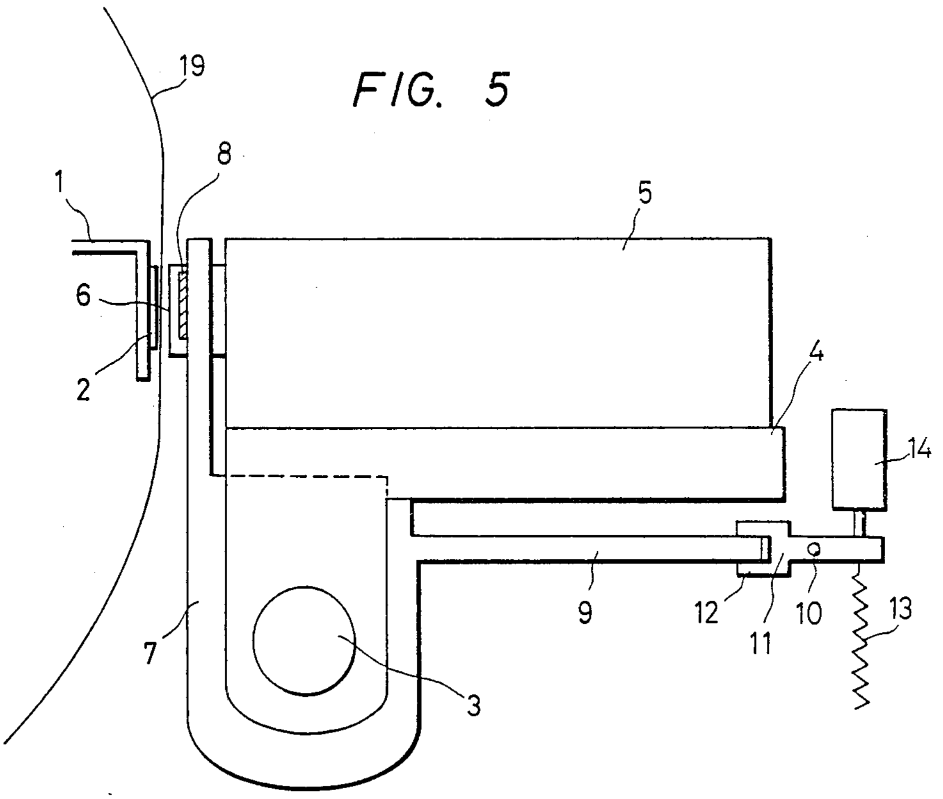
FIG. 5 is a schematic side view showing a general thermal transfer printer.
Figure 6:
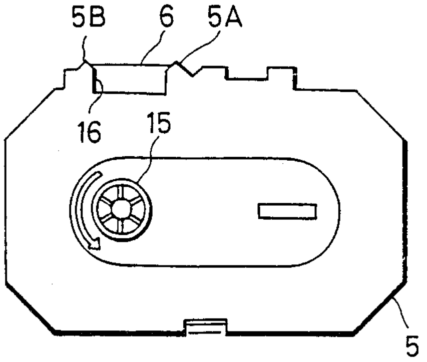
FIG. 6 is a plan view showing a ribbon cassette of a general type.
Figure 7:
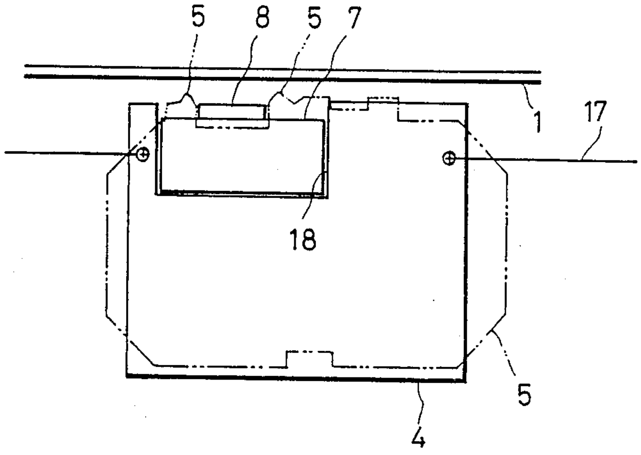
FIG. 7 PRIOR ART
FIGS. 7 and 8 are schematic plan views, respectively showing a conventional thermal transfer printer with a thermal head located at different positions.
Figure 8:
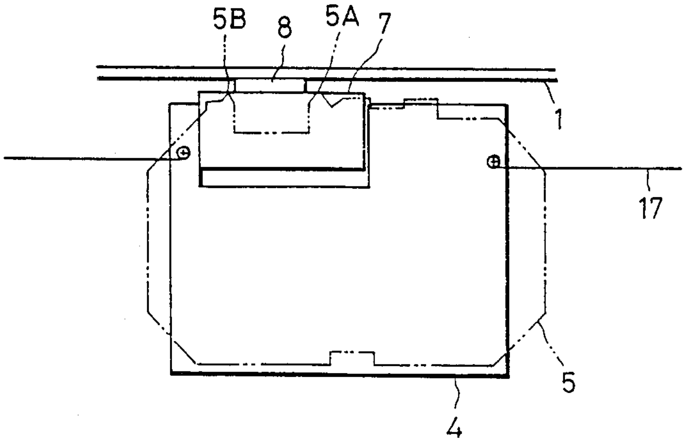
FIG. 8 PRIOR ART
Figure 9:
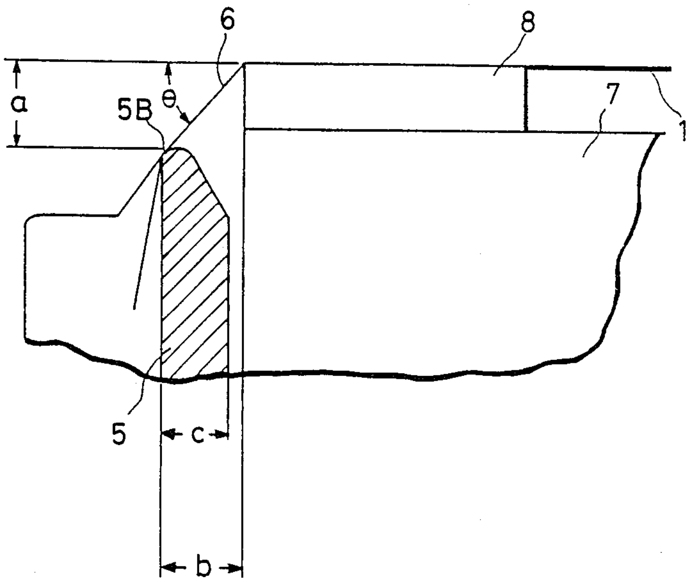
FIG. 9 PRIOR ART
FIG. 9 is a plan view showing a peel angle of an ink ribbon shown in FIGS. 7 and 8.

Referring to FIGS. 1 and 2, which show a first embodiment of the present invention, a wire 17 for moving a carriage 4 along the support shaft 3 (FIG. 5) is mounted on a head mounting member 7, and the carriage 4 is driven following the mounting member 7.

The width of a recess 18 formed in the carriage 4 into which the head mounting member 7 is fitted in the longitudinal direction of the platen 1, namely, in the moving direction of the carriage 4 is formed to be larger than the width of the head mounting member 7 in the same direction as that described above. The recess 18 extends to a position corresponding to the end of the ribbon cassette 5 beyond the ribbon pull-in portion 5*b* of the ribbon cassette 5 placed on the carriage 4. A projection 20 having an inclined guide surface 20A at the front end of the platen 1 is provided on the side 18A of the recess 18 corresponding to the ribbon take-out portion 5A of the ribbon cassette 5, and a coil spring 21 for pressing the head mounting member 7 against the side 18A of the recess 18 is interposed between the carriage 4 and the head mounting member 7.

The operation of the aforementioned embodiment will be described hereinafter.

In the state where the head mounting member 7 is positioned within the recess 18 of the carriage 4, the carriage 4 is urged leftward as viewed in FIG. 1 along the ribbon cassette 5 by the coil spring 21 interposed between the carriage 4 and the head mounting member 7 connected to the wire 17, and the side 18A of the recess 18 is in pressure contact with the right side of the head mounting member 7. In such a state as described above, when the head mounting member 7 is projected toward the platen 1, the mounting member 7 is slidably moved along the guide surface 20A of the projection 20, whereby the guide surface 20A of the projection 20 in pressure contact with the head mounting member 7 is moved rightward as viewed in FIG. 1 against the force of the coil spring 21, as a consequence of which in the state where the thermal head 8 mounted on the head mounting member 7 is in pressure contact with the platen 1, the left end of the thermal head 8 and the ribbon pull-in portion 5B of the ribbon cassette 5 assume the same position as the whole in the moving direction of the carriage 4. As a result, the peel angle of the ink ribbon 6 is to be large to provide a clear printing.

When the head mounting member 7 is moved backward into the recess 18 of the carriage 4 in order to move the thermal head 8 away from the platen 1, the carriage 4 is moved leftward as viewed in the figure by the force of the coil spring 21, and the relative position between the carriage 4 and the head mounting member 7 returns to its original position.

Figure 3:
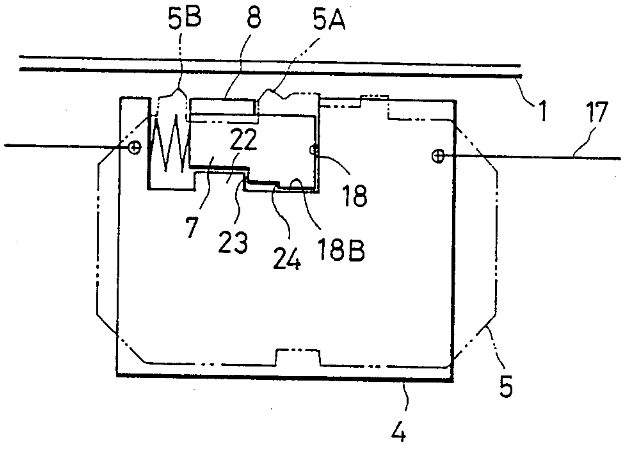
FIGS. 3 and 4 are schematic plan views, respectively, showing a second embodiment of the present invention with a thermal head located at different positions.
Figure 4:
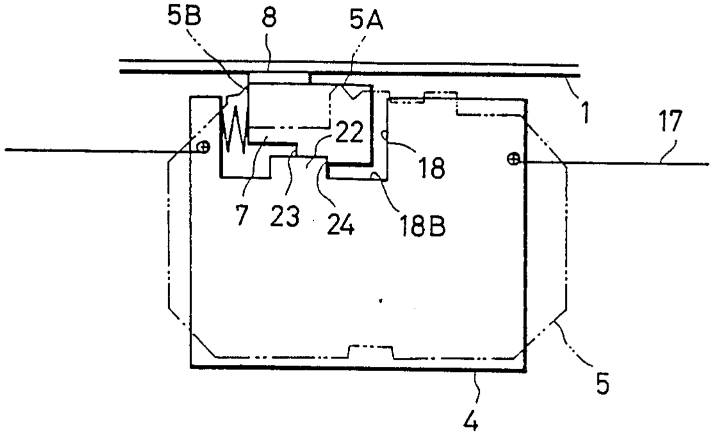

Turning now to FIGS. 3 and 4 showing a second embodiment, the wire 17 for moving the carriage 4 along the support shaft 3 (FIG. 5) is mounted on the carriage 4 is mounted on the carriage 4, and the head mounting member 7 is driven following the carriage 4.

The width of the recess 18 formed in the carriage 4 in the moving direction of the carriage 4 is formed to be larger than the width of the head mounting member 7 in the same direction as that described above, and a square projection 22 is provided on the bottom surface 18B of the recess 18. Two engaging shoulders 23 and 24 engageable with the projection 22 are formed on the back of the head mounting member 7, the lefthand shoulder 23 being positioned frontwardly of the righthand shoulder 24. A coil spring 21 for urging the head mounting member 7 leftward is interposed between the carriage 4 and the head mounting member 7.

The operation of the aforementioned embodiment will be described hereinafter.

In the state where the head mounting member 7 is positioned within the recess 18 of the carriage 4 as shown in FIG. 2, the head mounting member 7 is positioned close to the right side of the recess 18 by the action of the coil spring 21, and the lefthand engaging shoulder 23 engages the projection 22. When in that state the head mounting member 7 is projected toward the platen 1, the engagement of the shoulder 23 with the projection 22 is released, and therefore printing operation takes place whereby only the carriage 4 directly connected to the wire 17 moves rightward and in the state where the projection 22 engages the shoulder 24 of the ribbon cassette 5, the head mounting member 7 moves rightward along with the carriage 4. In the state where the projection 22 engages the shoulder 24, the thermal head 8 is in pressure contact with the platen 1, in which state the the left side of the thermal head 8 and the ribbon pull-in portion 5B of the ribbon cassette 5 assume the same position as the whole in the moving direction of the carriage 4. Accordingly, the peel angle of the ink ribbon 6 becomes large and a clear printing may be obtained similarly to the first embodiment.

The head mounting member 7 may be moved back into the recess 18 of the carriage 4 in the procedure such that first only the carriage 4 is moved leftward till the shoulder 23 of the head mounting member 7 engages the projection 22, and the head mounting member 7 is moved into the recess 18.

As described above, according to the present invention, the peel angle of the ink ribbon may be enlarged during printing, and as the result clear printing may be performed.

What is claimed is:

1. A thermal transfer printer wherein a ribbon cassette adapted to receive therein an ink ribbon which is guided outside from a ribbon take-out portion in a manner such that the ribbon is drawn out of a ribbon pull-in portion is placed on a carriage, and a head mounting member supporting the thermal head is disposed within a recess formed on the platen side of the carriage so that the mounting member may be moved to and from the platen, characterized by the provision of a moving mechanism in which the width of the recess in the carriage moving direction is formed to be larger than that of the head mounting member in the same direction as the former so that the carriage and the head mounting member may be relatively moved in the carriage moving direction, and the head mounting member and the carriage may be relatively moved so that when the head mounting member is projected from the recess of the carriage toward the platen, the head mounting member is moved close to the ribbon pull-in portion of the ribbon cassette within the recess.

2. The thermal transfer printer according to claim 1 wherein a wire for moving the carriage along a support shaft is mounted on the head mounting member, and the carriage is driven following the head mounting member.

3. The thermal transfer printer according to claim 2 wherein the wire for moving the carriage along the support shaft is mounted on the carriage, and the head mounting member is driven following the carriage.

4. The thermal transfer printer according to claim 1 wherein a projection having an inclined guide surface is provided on the side of the recess.

5. The thermal transfer printer according to claim 1 wherein a square projection is provided on the bottom of the recess, and two shoulders engageable with the projection are formed on the back of the head mounting member, one shoulder being located frontwardly of the other.

* * * * *